(12) United States Patent
Gaw et al.

(10) Patent No.: US 10,647,856 B2
(45) Date of Patent: May 12, 2020

(54) MOLD RESISTANT FORMABLE CORK

(71) Applicant: THE BOEING COMPANY, Chicago, IL (US)

(72) Inventors: Kevin O. Gaw, Seattle, WA (US); Mark W. Shorey, Des Moines, WA (US); Holly M. Rhoe, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 148 days.

(21) Appl. No.: 15/344,001

(22) Filed: Nov. 4, 2016

(65) Prior Publication Data
US 2018/0127597 A1   May 10, 2018

(51) Int. Cl.
*C09D 5/14* (2006.01)
*C08L 63/00* (2006.01)
(Continued)

(52) U.S. Cl.
CPC ............ *C09D 5/14* (2013.01); *A01N 25/10* (2013.01); *A01N 55/02* (2013.01); *B64C 1/40* (2013.01); *B64D 41/00* (2013.01); *B64G 1/58* (2013.01); *C08G 59/245* (2013.01); *C08G 59/50* (2013.01); *C08G 59/5093* (2013.01); *C08K 5/0091* (2013.01); *C08L 63/00* (2013.01);
(Continued)

(58) Field of Classification Search
CPC ............ C09D 5/185; B32B 3/12; B01J 35/04
USPC ............ 523/179; 524/16; 428/117, 413, 593
See application file for complete search history.

(56) References Cited

U.S. PATENT DOCUMENTS 4,031,059 A    6/1977 Strauss
4,772,495 A *  9/1988 Headrick ............... B64G 1/226
                                                    264/45.3
(Continued)

FOREIGN PATENT DOCUMENTS

JP   2013228065    * 11/2013
JP   2013228065 A    11/2013

OTHER PUBLICATIONS

European Patent Office Extended Search Report for Application No. 17199738.0-1102 dated Mar. 28, 2018.
(Continued)

*Primary Examiner* — Tae H Yoon
(74) *Attorney, Agent, or Firm* — Patterson + Sheridan, LLP

(57) ABSTRACT

Aspects described herein generally relate to a material that is the reaction product of:
a binder;
a curing agent; and
a zinc pyrithione represented by the formula:

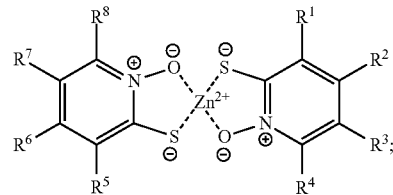

$R^1$, $R^2$, $R^3$, $R^4$, $R^5$, $R^6$, $R^7$, and $R^8$ is independently hydrogen, alkyl, cycloalkyl, alkoxyl, hydroxyl, aryl, or heterocyclyl, uses thereof as a heatshield material, and heatshields.

33 Claims, 4 Drawing Sheets

(51) Int. Cl.

| | |
|---|---|
| *C08L 97/00* | (2006.01) |
| *C08K 5/3432* | (2006.01) |
| *C08K 5/46* | (2006.01) |
| *C09D 5/18* | (2006.01) |
| *B32B 3/12* | (2006.01) |
| *B01J 35/04* | (2006.01) |
| *B64G 1/58* | (2006.01) |
| *C08K 5/00* | (2006.01) |
| *A01N 25/10* | (2006.01) |
| *A01N 55/02* | (2006.01) |
| *B64C 1/40* | (2006.01) |
| *B64D 41/00* | (2006.01) |
| *C08G 59/24* | (2006.01) |
| *C08G 59/50* | (2006.01) |
| *C09D 163/00* | (2006.01) |
| *F02C 3/04* | (2006.01) |
| *F02C 7/24* | (2006.01) |

(52) U.S. Cl.
CPC .......... *C08L 97/007* (2013.01); *C09D 163/00* (2013.01); *F02C 3/04* (2013.01); *F02C 7/24* (2013.01); *F05D 2220/323* (2013.01); *F05D 2260/231* (2013.01)

(56) References Cited

U.S. PATENT DOCUMENTS

| | | | | |
|---|---|---|---|---|
| 4,837,250 | A * | 6/1989 | Headrick | B64G 1/226 523/179 |
| 6,933,334 | B2 * | 8/2005 | Cosby | B64G 1/58 428/447 |
| 2010/0210745 | A1 * | 8/2010 | McDaniel | C09D 5/008 521/55 |
| 2014/0037894 | A1 * | 2/2014 | Higuchi | C08J 9/0085 428/117 |

OTHER PUBLICATIONS

De Carvalho Lopes A: 11 Zinc pyrithione paint composition comprises zinc pyrithione, hybrid, epoxy or carboxylated polyester resin, epoxy resin, curing agent, mineral fillers i.e. barium sulfate and barite, organic pigments, inorganic pigments and additive 11 , WPI I Thomson . . . vol. 2011, No. 35, Nov. 9, 2010 (Nov. 9, 2010), XP002677059, * abstract * & BR PIO 900 643 A2 (Isolucks Do Brasil L Toa EPP [BR]) Nov. 9, 2010 (Nov. 9, 2010).

* cited by examiner

MOLD RESISTANT FORMABLE CORK

FIELD

Aspects of the present disclosure generally relate to heatshields and heatshield materials.

BACKGROUND

Aerospace vehicles that traverse, exit, and enter the atmosphere of the Earth travel at high velocities, and as a result, their exterior aerosurfaces, and to some degree their substructure, experience extreme thermal conditions. Heatshield materials are materials having high thermal conductivity to ensure that heat is quickly conducted away from potential hot spots on the heatshield. Heatshield materials also have high specific heat capacity so that the temperature increase of the material after absorbing heat is lower than that of many other materials. When applied to surfaces of an aerospace vehicle, heatshield materials form a heatshield that protects and insulates the structure subjected to thermal stress by the extreme thermal conditions.

The thermal stress management technique using heatshield materials that ablate under high temperatures has been used for a variety of applications since the early 1930s. Heatshield materials were used in early rocket systems for nose cap protection and have also been used as re-entry heatshields on the Gemini and Apollo space vehicles, and further on many modern rocket nozzles.

Common cork based heatshield materials include cork epoxy, cork phenolic and cork silicone. The combustion of cork and phenolic resin to form weakened char is an important failure mode of cork phenolic heatshield materials. When the material is exposed to high heat flux and oxygen from ambient atmosphere, the cork-based heatshields quickly char and begin burning. Once ignited, the heatshield materials will continue to burn even after the external heat source is turned off. As the cork phenolic heatshield ablates, the surface of the heatshield will form char with cracks, the size of which increases with time. Eventually the remaining material will break and erode away due to the mechanical load or aerodynamic shear.

Many of these materials, although suitable for use in the aforementioned applications, have handling and longevity (shelf life) issues that preclude application on a system that is subjected to frequent handling and that may be stored for extended periods of time prior to use. A typical launch vehicle may sit on the launch pad for days prior to flight (or stored somewhere for years), and often the heatshield materials can absorb a significant amount of moisture if left unprotected. Mildew and fungus (mold) can accumulate in and on the cork material of the heatshield, which may affect mechanical and thermal properties of the heatshield. Attempts have been made to coat the cork-based resin with an antibiotic such as para-nitrophenol ($NO_2$-Ph-OH). However, this compound is highly water soluble (16 g/L) which correlates with its high toxicity, and is not permitted for use in aircraft in both the United States and the European Union.

Aerospace vehicles may also be protected from moisture (and mold) by coating heatshield surfaces with one or more sealant layers. These additional layers increase the weight and cost of the vehicle components and aerospace vehicles as a whole. These additional layers also increase the amount of time to manufacture such components and vehicles as a whole.

Therefore, there is a need in the art for new and improved heatshields and heatshield materials.

SUMMARY

In one aspect, a material, or reaction product thereof, comprises a binder, a curing agent, and a zinc pyrithione represented by the formula:

$R^1$, $R^2$, $R^3$, $R^4$, $R^5$, $R^6$, $R^7$, and $R^8$ are independently hydrogen, alkyl, cycloalkyl, alkoxyl, hydroxyl, aryl, or heterocyclyl.

In another aspect, a heatshield comprises a honeycomb core comprising a plurality of intersecting wall portions that form a plurality of cells. The heatshield also comprises a material disposed on a surface of at least one of the cells. The material is the reaction product of a binder, a curing agent, and a zinc pyrithione represented by the formula:

$R^1$, $R^2$, $R^3$, $R^4$, $R^5$, $R^6$, $R^7$, and $R^8$ are independently hydrogen, alkyl, cycloalkyl, alkoxyl, hydroxyl, aryl, or heterocyclyl.

In another aspect, an auxiliary power unit comprises a plurality of components, each having one or more surfaces. The auxiliary power unit further comprises a heatshield disposed on at least one of the one or more surfaces, the heatshield comprising a honeycomb core and a material that is the reaction product of a binder, a curing agent, and a zinc pyrithione represented by the formula:

$R^1$, $R^2$, $R^3$, $R^4$, $R^5$, $R^6$, $R^7$, and $R^8$ are independently hydrogen, alkyl, cycloalkyl, alkoxyl, hydroxyl, aryl, or heterocyclyl.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Definitions

The term "alkyl" includes a substituted or unsubstituted, linear or branched acyclic alkyl radical containing from 1 to about 20 carbon atoms. In at least one aspect, alkyl is a $C_{1-10}$alkyl, $C_{1-7}$alkyl or $C_{1-5}$alkyl. In at least one aspect, alkyl is selected from methyl, ethyl, propyl, butyl, pentyl, hexyl, heptyl, octyl, nonyl, decyl, and structural isomers thereof.

The term "cycloalkyl" includes a substituted or unsubstituted, cyclic alkyl radical containing from 1 to about 20 carbon atoms.

The term "aryl" includes a substituted or unsubstituted carbon-containing aromatic ring. In at least one aspect, aryl is selected from phenyl, naphthyl, anthracenyl, or pyrenyl.

The term "alkoxyl" includes an alkyl ether or aryl ether where the term alkyl and aryl are as defined above. In at least one aspect, alkoxyl is selected from methoxyl, ethoxyl, propoxyl, butoxyl, pentoxyl, hexyloxyl, heptyloxyl, octyloxyl, nonyloxyl, decyloxyl, and structural isomers thereof.

The term "heterocyclyl" includes a ring having at least one heteroatom (i.e., not carbon) within the cyclized ring. Heterocyclyl includes a monocyclic, bicyclic or tricyclic ring having from 3 to about 15 ring atoms selected from carbon, nitrogen, sulfur and oxygen, where at least one ring atom is a heteroatom. Heterocyclyl includes a fully saturated ring (e.g., heterocycloalkyl), partially saturated ring (e.g., heterocycloalkenyl) and a fully unsaturated ring (e.g., heteroaryl). Non-limiting examples of fully saturated five- and six-membered heterocyclyl include pyrrolidinyl, imidazolidinyl, piperidinyl, piperazinyl, tetrahydrofuranyl, morpholinyl and thiazolidinyl.

The term "hydroxyl" refers to —OH.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

Materials

Aspects of the present disclosure generally relate to heatshields and heatshield materials.

In at least one aspect, a material, such as a heatshield material, comprises (and/or is the reaction product of) (1) a binder, (2) a curing agent, and (3) an antibiotic additive. In at least one aspect, a material, such as a heatshield material, further comprises (4) cork.

Binders

A binder in accordance with materials of the present disclosure provides mechanical strength and thermal stability to the material. Binders have one or more electrophilic moieties, such as an epoxide, that can react with a curing agent to form a material with increased mechanical strength and thermal stress resistance properties. A binder can be selected from phenolic, epoxy, silicone, polyurethane, and mixtures thereof.

Phenolics can be selected from novolac, resole, and mixtures thereof, which have high temperature stability (e.g., 300°-350° C.) and high water and chemical stability. Epoxies can be selected from partially cured epoxies, two-component epoxy resins that include a catalyst (such as HYSOL® EA 956 epoxy resin available from Henkel Corporation of Bay Point, Calif.), a two liquid system that includes both a resin and a hardener (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), poly[(phenyl glycidyl ether)-codicyclopentadiene] (such as Tactix 556). Epoxies may also include a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 or GY285 (Huntsman Advanced Materials). Epoxy can be represented by the formula:

The epoxy can also be a mixture of different epoxies.

Silicone can be selected from a high temperature silicone resin binder (such as Dow Corning Sylgard 184 resin), or oligosiloxane, such as an oligosiloxane represented by the formula $R_nSiX_mO_y$. R is a nonreactive substituent, e.g., methyl or phenyl, and X is hydrogen, hydroxyl (—OH), halogen (F, Cl, Br, I) or alkoxyl. n, m, and y are integers such that the weight average molecular weight (Mw) of the silicone is between about 1,000 and about 10,000.

In at least one aspect, polyurethane is represented by the formula:

x is an integer between about 10 and about 10,000. $R^1$, $R^2$, $R^3$, $R^4$, and $R^5$ are independently hydrogen or $C_1$-$C_{20}$ alkyl. Polyurethanes can be selected from Aptek 2100 A/B and Aerodur 3002 (available from Argosy International, Inc.). Polyurethanes can be unsubstituted, monosubstituted, or multiply substituted (e.g., disubstituted, trisubstituted, or tetrasubstituted on one or more phenyl rings) where each instance of substitution is selected from alkyl (e.g., $C_1$-$C_{20}$ alkyl), aryl, amino, nitro, and halo (—F, —Cl, —Br, —I).

Curing Agents

A curing agent in accordance with materials of the present disclosure provides mechanical strength and thermal stability to the material. A curing agent has one or more nucleophilic moieties, such as an amine, to react with the one or more electrophilic moieties of a binder. Curing agents can be selected from amines, such as monoamines, diamines, triamines, tetraamines, pentamines, hexamines, heptamines, octamines, nonamines, decamines, and mixtures thereof. Diamines include alkyl diamines, cycloalkyl diamines, monoaryl diamines, and polyaryl diamines. Cycloalkyl diamine can be 4,4'-methylenebis(cyclo-hexan-1-amine). Monoaryl diamines include 1,4-diaminobenzene. Polyaryl diamines include those listed in Table I:

TABLE I

| Polyaryl Diamines. | |
|---|---|
| Structure | Name |
| $H_2N$—⌬—S(=O)(=O)—⌬—$NH_2$ | 4,4'-sulfonyldianiline (44DDS) |
| $H_2N$—⌬—$CH_2$—⌬—$NH_2$ | 4,4'-methylenedianiline (MDA) |
| $H_2N$—⌬—O—⌬—$NH_2$ | 4,4'-oxydianiline (44ODA) |
| $H_2N$—⌬—O—⌬—O—⌬—$NH_2$ | 3,3'-(1,3-phenylenebis(oxy))-dianiline (APB133) |
| $H_2N$—⌬—O—⌬—O—⌬—$NH_2$ | 4,4'-(1,3-phenylenebis(oxy))-dianiline (TPE-R) |

TABLE I-continued

Polyaryl Diamines.

| Structure | Name |
|---|---|
| | 4,4'-methylenebis(2-ethyl-aniline) |
| | 3,3'-((2,2-dimethylpropane-1,3-diyl)bis(oxy))dianiline (DANPG) |
| | 4,4'-(1,4-phenylenebis-(propane-2,2-diyl))dianiline |
| | 3-(4-(4-aminobenyl)-benzyl)aniline |
| | 4,4'-(1,4-phenylenebis(propane-2,2-diyl))bis(2,6-dimethylaniline) (EPON-1062-M) |
| | 4,4'-(1,4-phenylenebis(oxy))-dianiline (TPE-Q) |
| | 3,3'-((propane-2,2-diylbis-(4,1phenylene))bis(oxy))-dianiline |
| | 3,3'-sulfonyldianiline (33DDS) |
| | 4,4'-thiodianiline (ASD) |
| | 3,3'-((sulfonylbis(4,1-phenylene))bis(oxy))dianiline (m-BAPS) or (3BAPS) |

TABLE I-continued

Polyaryl Diamines.

| Structure | Name |
|---|---|
| | 4,4'-(1,4-phenylenedi-sulfonyl)dianiline |
| | 4,4'-(pentane-1,5-diylbis-(oxy))dianiline (DA5MG) |
| | 4,4'-([1,1'-biphenyl]-4,4'-diylbis(oxy))dianiline (BAPB) |
| | 4,4'-(1,3-phenylenebis-(propane-2,2-diyl))bis(2,6-diisopropylaniline) |
| | 4,4'-(1,3-phenylenebis-(propane-2,2-diyl)dianiline (Bisaniline M) |
| | 4,4'-((sulfonylbis(4,1-phenylene))bis(oxy))dianiline (BAPS) |
| | 4,4'-((propane-2,2-diylbis-(4,1phenylene))bis(oxy))-dianiline (BAPP) |
| | 4,4'-disulfanediyldianiline |

Amines also include polyaminoamides, which are polymeric fatty acids typically prepared by thermal polymerization of unsaturated fatty acids, for example, linoleic acid, linolenic, oleic acid, stearic acid and the like. VERSAMID® (tradename) resins sold by Cognis BASF are, for example, condensation products of dimer acids and a mixture of alkylene polyamines. Commercially available polyaminoamides include, for example, VERSAMID® 140, VERSAMID® 125 and VERSAMID® 115 from Cognis BASF; (HY 815, E-115), (HY 825, E-125), and (HY 840, E-140)

from Hunstman; EPIKURE® 3115A, EPIKURE® 3125, EPIKURE® 3140, EPIKURE® 3015 from Hexion Specialty Chemicals Inc.; Ancamide® 220, Ancamide® 260A, Ancamide® 350A, and Ancamide® 503 from Air Products; RoyOxy™ RAC 9543, RoyOxy™ RAC 9544, RoyOxy™ RAC 9546, and RoyOxy™ RAC 9503 from RoyOxy™.

Antibiotic Additives

An antibiotic additive in accordance with materials of the present disclosure prevents moisture-related damage, such as mold, to the material. Antibiotic additives of the present disclosure are zinc pyrithiones (and isomers thereof). Isomers of zinc pyrithiones include zinc 1-oxidopyridine-2-thiones.

In at least one aspect, a zinc pyrithione is represented by the formula:

$R^1$, $R^2$, $R^3$, $R^4$, $R^5$, $R^6$, $R^7$, and $R^8$ are independently hydrogen, alkyl, cycloalkyl, alkoxyl, hydroxyl, aryl, or heterocyclyl. In at least one aspect, each of $R^1$, $R^2$, $R^3$, $R^4$, $R^5$, $R^6$, $R^7$, and $R^8$ is hydrogen.

Zinc pyrithiones do not have restrictions for aircraft applications in the European Union or elsewhere worldwide, some are commercially available, they are easy to synthesize, and are inexpensive. Furthermore, decomposition temperatures of zinc pyrithiones are high (e.g., 464° F.), they have limited water solubility (e.g., 8 ppm at pH 7), and have antibiotic activity sufficient to prevent or reduce microbial degradation of biologically active components (such as cork) on or within the material. In at least one aspect, a zinc pyrithione has a decomposition temperature greater than about 200° F., such as greater than about 300° F., such as greater than about 400° F., such as greater than about 450° F. In at least one aspect, a zinc pyrithione has a water solubility of less than 500 ppm at pH 7, such as less than 400 ppm at pH 7, such as less than 300 ppm at pH 7, such as less than 200 ppm at pH 7, such as less than 100 ppm at pH 7, such as less than 50 ppm at pH 7, such as less than 25 ppm at pH 7, such as less than 10 ppm at pH 7.

Furthermore, zinc pyrithiones of the present disclosure can be present in a material, such as a heatshield material, in amounts small enough such that the physical properties of the material are improved or not substantially altered compared to an otherwise identical material without a zinc pyrithione. Materials of the present disclosure have a density of between about 0.5 g/cc and about 1.5 g/cc, such as between about 0.8 g/cc and about 1.2 g/cc, for example about 0.8 g/cc. Higher density materials usually offer good ablation performance, but also have higher thermal conductivities and are therefore poor insulators. Furthermore, zinc pyrithiones of the present disclosure can be present in a material, such as a heatshield material, in amounts small enough such that pot life of the material is improved or not substantially altered compared to an otherwise identical material without a zinc pyrithione. In at least one aspect, a pot life of a material of the present disclosure comprising a zinc pyrithione is less than about 24 hours at room temperature.

Furthermore, a zinc pyrithione provides dual functionality when present within or disposed on a material of the present disclosure: (1) as an antibiotic to reduce or eliminate mold formation, and (2) as a curing agent in addition to the curing agent, as described above. Without being bound by theory, heteroatoms of a zinc pyrithione (such as oxygen, nitrogen, and/or sulfur) may perform nucleophilic attack of an electrophilic moiety of a binder, such as an epoxy moiety. Such dual functionality provides reduced pot life in addition to reduction or elimination of mildew and fungus (mold) accumulation within or on the material, while maintaining or improving the physical properties of the material (as compared to the material without zinc pyrithione). In at least one aspect, substantially all of the zinc pyrithione of a material reacts with a binder. In at least one aspect, only a portion of the zinc pyrithione of a material reacts with a binder.

As a comparative example, other antibiotics, such as selenium disulfide, do not possess such dual functionality and act only as an inert filler without a curative functionality if present in a material having a binder and curing agent.

Furthermore, a zinc pyrithione can be incorporated into the binder/curing agent of materials of the present disclosure. Conventional antibiotics, such as para-nitrophenol, have been applied to an outer surface of a binder layer on a substrate. Unlike conventional antibiotics that are only applied to a binder surface, incorporation of zinc pyrithione into a binder prevents mold formation within the material, on the material, and/or adjacent the material even if a surface of the material chips away during use and regardless of how large of a surface area of the material is chipped away (i.e., exposed). Such incorporation of zinc pyrithione extends the lifetime of the advantageous physical and mechanical properties of the material.

In at least one embodiment, a material of the present disclosure has a molar ratio of binder to curing agent between about 0.3:1 and about 1:0.3, such as between about 0.5:1 and about 1:0.5, such as between about 0.7:1 and about 1:0.7, such as between about 0.9:1 and about 1:0.9, for example 1:1. In at least one embodiment, a material of the present disclosure is made of less than about 20 wt % zinc pyrithione content, such as less than about 10 wt %, such as less than about 5 wt %, such as less than about 2 wt %, such as less than about 1 wt %, such as less than about 0.5 wt %. Even small amounts of zinc pyrithione, such as 0.5 wt %, can be sufficient to reduce or prevent mold formation on or within a material of the present disclosure. Increased amounts of zinc pyrithione, such as 2 wt % or 5 wt %, may be desired for heatshield material used or stored in more humid environments, such as a tropical climate, due to the increased propensity of mold formation in such climates.

Zinc pyrithiones may be synthesized as shown in Scheme 1 by mixing $ZnCl_2$ with substituted or unsubstituted 2-mercaptopyridine N-oxide in any suitable solvent at a molar ratio of about 1:2 $ZnCl_2$ to 2-mercaptopyridine N-oxide. A base may be used to deprotonate the thiol to react with $ZnCl_2$. Solvents include dichloromethane or ethanol. Bases include triethylamine. Starting materials may be synthesized or obtained from Sigma-Aldrich of St. Louis, Mo. $R^1$, $R^2$, $R^3$, $R^4$, $R^5$, $R^6$, $R^7$, and $R^8$ are as described above.

Scheme 1

Non-limiting examples of 2-mercaptopyridine N-oxide include:

Cork

Cork in accordance with materials of the present disclosure provides light-weight insulation to the material. Cork is a cellulosic growth structure grown on and obtained from the external surfaces of a cork oak tree. Cork, with over 200 million cells per cubic inch, works well as a heatshield material because of the structure and mechanics of these cells. It can be used as insulation material for launch vehicles because of its low density yet resilient mechanical properties, minimal cost, its ability to absorb vibration and withstand acoustic noise, and, its chemical stability.

In at least one aspect, a material of the present disclosure is made of between about 1 wt % and about 35 wt % cork, such as between about 5 wt % and about 20 wt %, such as between about 8 wt % and about 12 wt %, for example 10 wt %. Cork can be present in a material as cork board (e.g., a sheet of cork) and/or as particles of cork. Particles can be formed by grinding cork board to form particles of a desired diameter. The particles are mixed with a binder, a curing agent, and antibiotic additive before curing to form a material. Particles can have a particle diameter of from about 1 mm to about 1 inch, such as from about 0.001 inch to about 0.01 inch, such as from about 0.001 inch to about 0.005 inch, such as from about 0.5 mm to about 1 mm.

Fillers

Materials of the present disclosure can have one or more fillers. Fillers in accordance with materials of the present disclosure provide additional mechanical strength to the material. Conventional heatshield materials have fillers, often at a weight ratio of binder to filler of 1:1 or higher. Such large filler content adds substantial weight to the material which is not ideal for vehicles, such as aircraft, due to added weight and, accordingly, added fuel consumption. The dual functionality of zinc pyrithiones of the present disclosure provides materials with optional filler content. If present in materials of the present disclosure, fillers can be selected from silica or glass microspheres, phenolic microballoons, silica microballoons, silica, carbon fibers, or combinations thereof. In at least one embodiment, a material of the present disclosure has less than about 50 wt % filler, such as less than about 40 wt % filler, such as less than about 30 wt % filler, such as less than about 20 wt % filler, such as less than about 10 wt % filler, such as less than about 5 wt % filler.

EXAMPLE MATERIALS

Example 1

A material was tested to determine resistance of the material to fungi, according to ASTM G21-15 (described in detail below). Cork was ground to particle size of 0.5-1 mm. The material comprised an epoxy, a diamine, cork (10-20 wt % of the material), and unsubstituted zinc pyrithione represented by the structure:

Zinc pyrithione was purchased commercially. The diamine was Versamid 125 (a polyaminoamide at 50% of remaining fraction) and the epoxy was EPON 828 (which is a difunctional bisphenol A/epichlorohydrin derived liquid epoxy resin) (at 50% of the remaining fraction). Then (1-2% by weight of the mixture) of zinc pyrithione (Sureshield 1000) was added.

The epoxy, diamine, cork, and zinc pyrithione were mixed in a material container using a spatula. The material was then scooped from the container with the spatula and spread to a thickness of about 0.1 inch on a turbine engine APU surface. Fungi strains tested were *Aspergillus brasiliensis* B 9642, *Penicillium funiculosum* C 11797, *Chaetomium globosum* 6205, *Trichoderma virens* D 9645, and *Aureobasidium pullans* 15233. The material showed robust antibiotic activity against these fungi strains with a rating of 0 after 4 weeks.

Example 2

Cork was ground to particle size of 0.5-1 mm. The material comprised an epoxy, a diamine, cork (10-20 wt % of the material), and zinc pyrithione represented by the structure:

Zinc pyrithione was purchased commercially. The diamine was Versamid 125 (a polyaminoamide at 50% of remaining fraction) and the epoxy was EPON 828 (which is a difunctional bisphenol A/epichlorohydrin derived liquid epoxy resin) (at 50% of the remaining fraction). Then (1-2% by weight of the mixture) of zinc pyrithione was added.

The epoxy, diamine, cork, and zinc pyrithione were mixed in a material container using a spatula. The material was then scooped from the container with the spatula and spread to a thickness of about 0.1 inch on a turbine engine APU surface.

Example 3

Cork was ground to particle size of 0.5-1 mm. The material comprised an epoxy, a diamine, cork (10-20 wt % of the material), and zinc pyrithione represented by the structure:

Zinc pyrithione was purchased commercially. The diamine was Versamid 125 (a polyaminoamide at 50% of remaining fraction) and the epoxy was EPON 828 (which is a difunctional bisphenol A/epichlorohydrin derived liquid epoxy resin) (at 50% of the remaining fraction). Then (1-2% by weight of the mixture) of zinc pyrithione was added.

The epoxy, diamine, cork, and zinc pyrithione were mixed in a material container using a spatula. The material was then scooped from the container with the spatula and spread to a thickness of about 0.1 inch on a turbine engine APU surface.

Example 4

Cork was ground to particle size of 0.5-1 mm. The material comprised an epoxy, a diamine, cork (10-20 wt % of the material), and zinc pyrithione represented by the structure Zinc pyrithione was purchased commercially. The diamine was Versamid 125 (a polyaminoamide at 50% of remaining fraction) and the epoxy was EPON 828 (which is a difunctional bisphenol A/epichlorohydrin derived liquid epoxy resin) (at 50% of the remaining fraction). Then (1-2% by weight of the mixture) of zinc pyrithione was added.

The epoxy, diamine, cork, and zinc pyrithione were mixed in a material container using a spatula. The material was then scooped from the container with the spatula and spread to a thickness of about 0.1 inch on a turbine engine APU surface.

ASTM G21-15 recites: "1. Scope 1.1 This practice covers determination of the effect of fungi on the properties of synthetic polymeric materials in the form of molded and fabricated articles, tubes, rods, sheets, and film materials. Changes in optical, mechanical, and electrical properties may be determined by the applicable ASTM methods. 1.2 The values stated in SI units are to be regarded as the standard. The inch-pound units given in parentheses are for information only. 1.3 This standard does not purport to address all of the safety concerns, if any, associated with its use. It is the responsibility of the user of this standard to establish appropriate safety and health practices and determine the applicability of regulatory limitations prior to use. 2. Referenced Documents 2.1 ASTM Standards:2 D149 Test Method for Dielectric Breakdown Voltage and Dielectric Strength of Solid Electrical Insulating Materials at Commercial Power Frequencies D150 Test Methods for AC Loss Characteristics and Permittivity (Dielectric Constant) of Solid Electrical Insulation D257 Test Methods for DC Resistance or Conductance of Insulating Materials D495 Test Method for High-Voltage, Low-Current, Dry Arc Resistance of Solid Electrical Insulation D618 Practice for Conditioning Plastics for Testing D638 Test Method for Tensile Properties of Plastics D747 Test Method for Apparent Bending Modulus of Plastics by Means of a Cantilever Beam D785 Test Method for Rockwell Hardness of Plastics and Electrical Insulating Materials D882 Test Method for Tensile Properties of Thin Plastic Sheeting D1003 Test Method for Haze and Luminous Transmittance of Transparent Plastics D1708 Test Method for Tensile Properties of Plastics by Use of Microtensile Specimens E96/E96M Test Methods for Water Vapor Transmission of Materials E308 Practice for Computing the Colors of Objects by Using the CIE System 2.2 TAPPI Standard: Test Method T 451-CM-484 Flexural Properties of Paper3 2.3 Federal Standards: FED STD 191 Method 5204 Stiffness of Cloth, Directional; Self Weighted Cantilever Method4 FED STD 191 Method 5206 Stiffness of Cloth Drape and Flex; Cantilever Bending Method 4 3. Summary of Practice 3.1 The procedure described in this practice consists of selection of suitable specimens for determination of pertinent properties, inoculation of the specimens with suitable organisms, exposure of inoculated specimens under conditions favorable to growth, examination and rating for visual growth, and removal of the specimens and observations for testing, either before cleaning or after cleaning and reconditioning. NOTE 1—Since the procedure involves handling and working with fungi, it is recommended that personnel trained in microbiology perform the portion of the procedure involving handling of organisms and inoculated specimens. 4. Significance and Use 4.1 The synthetic polymer portion of these materials is usually fungus-resistant in that it does not serve as a carbon source for the growth of fungi. It is generally the other components, such as plasticizers, cellulosics, lubricants, stabilizers, and colorants, that are responsible for fungus attack on plastic materials. To assess materials other than plastics, use of this test method should be agreed upon by all parties involved. It is important to establish the resistance to microbial attack under conditions favorable for such attack, namely, a temperature of 2 to 38° C. (35 to 100° F.) and a relative humidity of 60 to 100%. 4.2 The effects to be expected are as follows: 4.2.1 Surface attack, discoloration, loss of transmission (optical), and 4.2.2 Removal of susceptible plasticizers, modifiers, and lubricants, resulting in increased modulus (stiffness), changes in weight, dimensions, and other physical properties, and deterioration of electrical properties such as insulation resistance, dielectric constant, power factor, and dielectric strength. 4.3 Often the changes in electrical properties are due principally to surface growth and its associated moisture and to pH changes caused by excreted metabolic products. Other effects include preferential growth caused by nonuniform dispersion of plasticizers, lubricants, and other processing additives. Attack on these materials often leaves ionized conducting paths. Pronounced physical changes are observed on products in film form or as coatings, where the ratio of surface to volume is high, and where nutrient materials such as plasticizers and lubricants continue to diffuse to the surface as they are utilized by the organisms. 4.4 Since attack by organisms involves a large element of chance due to local accelerations and inhibitions, the order of reproducibility may be rather low. To ensure that estimates of behavior are not too optimistic, the greatest observed degree of deterioration should be reported. 4.5 Conditioning of the specimens, such as exposure to leaching, weathering, heat treatment, etc., may have significant effects on the resistance to fungi. Determination of these effects is not covered in this practice. 5. Apparatus 5.1 Glassware—Glass or plastic vessels are suitable for holding specimens when laid flat. Depending on the size of the specimens, the following are suggested: 5.1.1 For specimens up to 75 mm (3 in.) in diameter, 100 by 100 mm (4¼ by 4¼ in.) plastic boxes5 or 150-mm (6-in.) covered Petri dishes, and 5.1.2 For 75 mm (3 in.) and larger specimens, such as tensile and stiffness strips, large Petri dishes, trays of borosilicate glass, or baking dishes up to 400 by 500 mm (16 by 20 in.) in size, covered with squares of window glass. 5.2 Incubator—Incubating equipment for all test methods shall maintain a temperature of 28 to 30° C. (82.4 to 86° F.) and a relative humidity not less than 85%. Automatic recording of wet and dry-bulb temperature is recommended. 6. Reagents and Materials 6.1 Purity of Reagents—Reagent grade chemicals shall be used in all tests. Unless otherwise indicated, it is intended that all reagents shall conform to the specifications of the Committee on Analytical Reagents of the American Chemical Society, where such specification are available.6 Other grades may be used, provided it is first ascertained that the reagent is of sufficiently high purity to permit its use without lessening the accuracy of the determination. 6.2 Purity of Water—Unless otherwise indicated, references to water shall be understood to mean distilled water or water of equal or higher purity. 6.3 Nutrient-Salts Agar—Prepare this medium by dissolving in 1 L of water the designated amounts of the following reagents: Potassium dihydrogen orthophosphate ($KH_2PO_4$) 0.7 g, Magnesium sulfate ($MgSO_4.7H_2O$) 0.7 g, Ammonium nitrate ($NH_4NO_3$) 1.0 g, Sodium chloride (NaCl) 0.005 g, Ferrous sulfate ($FeSO_4.7H_2O$) 0.002 g, Zinc sulfate ($ZnSO_4.7H_2O$) 0.002 g, Manganous sulfate ($MnSO_4.H_2O$) 0.001 g, Agar 15.0 g, Dipotassium monohydrogen orthophosphate ($K_2HPO_4$) 0.7 g, 6.3.1 Sterilize the test medium by autoclaving at 121° C. (250° F.) for 20 min. Adjust the pH of the medium so that after sterilization the pH is between 6.0 and 6.5. 6.3.2 Prepare sufficient medium for the required tests. 6.3.3 Nutrient—Salts Broth—Prepare using the formula in 6.3, omitting the agar. Broth may be filter sterilized to avoid the precipitation of the salts that occurs with autoclaving. 6.4 Mixed Fungus Spore Suspension: NOTE 2—Since a number of other organisms may be of specific interest for certain final assemblies or components, such other pure cultures of organisms may be used if agreed upon by the purchaser and the manufacturer of the plastic. Reference (1)7 illustrates such a choice. 6.4.1 Use the following test fungi in preparing the cultures: Fungi ATCC No. A *Aspergillus brasiliensis*B 9642, *Penicillium funiculosum*C 11797, *Chaetomium globosum* 6205, *Trichoderma virens*D 9645, *Aureobasidium pullulans* 15233, AAvailable from American Type Culture Collection, 12301 Parklawn Drive, Rockville, Md. 20852., BHistorically known as *A. niger.*, CHistorically known as *P. pinophilum.*, DHistorically known as *Gliocladium virens*. 6.4.1.1 Maintain cultures of these fungi separately on an appropriate medium such as potato dextrose agar. The stock cultures may be kept for not more than four months at approximately 3 to 10° C. (37 to 50° F.). Use subcultures incubated at 28 to 30° C. (82 to 86° F.) for 7 to 20 days in preparing the spore suspension. 6.4.1.2 Prepare a spore suspension of each of the five fungi by pouring into one subculture of each fungus a sterile 10-mL portion of water or of a sterile solution containing 0.05 g/L of a nontoxic wetting agent such as sodium dioctyl sulfosuccinate. Use a sterile platinum, plastic, or nichrome inoculating wire to gently scrape the surface growth from the culture of the test organism. 6.4.2 Pour the spore charge into a sterile flask or tube containing 45 mL of sterile water with wetting agent and 10 to 15 solid glass beads. Cap and shake the flask vigorously to liberate the spores from the fruiting bodies and to break the spore clumps. 6.4.3 Alternatively, the spore charge can be poured into a sterile glass tissue grinder and gently ground to break up the spore clumps and liberate the spores from the fruiting bodies. 6.4.4 Filter the shaken or ground suspension through a thin layer of sterile glass wool in a glass funnel into a sterile flask in order to remove mycelial fragments. 6.4.5 Centrifuge the filtered spore suspension aseptically, and discard the supernatant liquid. Resuspend the residue in an aliquot of sterile water and centrifuge. 6.4.6 If large mycelia fragments or clumps of agar were dislodged during the harvesting, wash the spores in this manner three times to remove possible nutrient carryover from the original cultures. Dilute the final washed residue with sterile nutrient-salts solution (see 6.3.3) in such a manner that the resultant spore suspension shall contain 1 000 000 6 200 000 spores/mL as determined with a counting chamber. 6.4.7 Repeat this operation for each organism used in the test and blend equal volumes of the resultant spore suspension to obtain the final mixed spore suspension. 6.4.8 The mixed spore suspension may be prepared fresh each day or may be held in the refrigerator at 3 to 10° C. (37 to 50° F.) for not more than four days. The individual spore suspensions may be held in the refrigerator at 3 to 10° C. (37 to 50° F.) for not more than fourteen days. 7. Viability Control 7.1 With each daily group of tests place each of three pieces of sterilized filter paper, 25 mm (1 in.) square, on hardened nutrient-salts agar in separate Petri dishes. Inoculate these, along with the test items, with the spore suspension by spraying the suspension from a sterilized atomizer8 so that the entire surface is moistened with the spore suspension. Incubate these at 28 to 30° C. (82 to 86° F.) at a relative humidity not less than 85% and examine them after 14 days' incubation. There shall be copious growth on all three of the filter paper control specimens. Absence of such growth requires repetition of the test. 8. Test Specimens 8.1 The simplest specimen may be a 50 by 50-mm (2 by 2-in.) piece, a 50-mm (2-in.) diameter piece, or a piece (rod or tubing) at least 76 mm (3 in.) long cut from the material to be tested. Completely fabricated parts or sections cut from fabricated parts may be used as test specimens. On such specimens, observation of effect is limited to appearance, density of growth, optical reflection or transmission, or manual evaluation of change in physical properties such as stiffness. 8.2 Film-forming materials such as coatings may be tested in the form of films at least 50 by 25 mm (2 by 1 in.) in size. Such films may be prepared by casting on glass and stripping after cure, or by impregnating (completely covering) filter paper or ignited glass fabric. 8.3 For visual evaluation, three specimens shall be inoculated. If the specimen is different on two sides, three specimens of each, face up and face down, shall be tested. NOTE 3—In devising a test program intended to reveal quantitative changes occurring during and after fungal attack, an adequate number of specimens should be evaluated to establish a valid value for the original property. If five replicate specimens are required to establish a tensile strength of a film material, the same number of specimens shall be removed and tested for each exposure period. It is to be expected that values of physical properties at various stages of fungal attack will be variable; the values indicating the greatest degradation are the most significant (see 4.4). Reference (2) may be used as a guide. 9. Procedure 9.1 Inoculation—Pour sufficient nutrient-salts agar into suitable sterile dishes (see 5.1) to provide a solidified agar layer from 3 to 6 mm (⅛ to ¼ in.) in depth. After the agar is solidified, place the specimens on the surface of the agar. Inoculate the surface, including the surface of the test specimens, with the composite spore suspension by spraying the suspension from a sterilized atomizer8 so that the entire surface is moistened with the spore suspension. 9.2 Incubation Conditions: 9.2.1 Incubation—Cover the inoculated test specimens and incubate at 28 to 30° C. (82 to 86° F.) and not less than 85% relative humidity. NOTE 4—Covered dishes containing nutrient agar are considered to have the desired humidity. Covers on large dishes may be sealed with masking tape. 9.2.2 Incubation Duration—The standard length of the test is 28 days of incubation. The test may be terminated in less than 28 days for samples exhibiting a growth rating of two or more. The final report must detail the actual duration of incubation. 9.3 Observation for Visible Effects—If the test is for visible effects only, remove the specimens from the incubator and rate them as follows: Observed Growth on Specimens (Sporulating or Non-Sporulating, or Both) Rating, None 0, Traces of growth (less than 10%) 1, Light growth (10 to 30%) 2, Medium growth (30 to 60%) 3, Heavy growth (60% to complete coverage) 4.9.3.1 Specimens are rated after the fourth week. At Week 4, a rating of trace or no growth (one or less) is confirmed with the stereoscope using oblique lighting and the magnification is recorded. Growth includes sporulating and non-sporulating hyphae. Traces of growth may be defined as scattered, sparse fungus growth such as might develop from a mass of spores in the original inoculum, or extraneous contamination such as fingermarks, insect feces, etc. Continuous cobwebby growth extending over the entire specimen, even though not obscuring the specimen, should be rated as two. When non-test organisms are present, include all growth of test and non-test organisms in the final rating. NOTE 5—Considerable physical change in plastics may occur without much visual growth, hence some measure of change in physical property selected from those cited in the appendix is recommended. 9.4 Effect on Physical, Optical, or Electrical Properties—Wash the specimens free of growth, immerse in an aqueous solution of mercuric chloride (1+1000) for 5 min, rinse in tap water, air dry overnight at room temperature, and recondition at the standard laboratory conditions defined in Practice D618, 23 6 1° C. (73 62° F.) and 50 6 5% relative humidity, and test according to the respective methods used on control specimens (see the appendix). NOTE 6—For certain electrical tests, such as insulation and arc resistance, specimens may be tested in the unwashed, humidified condition. Test values will be affected by surface growth and its associated moisture. 10. Report 10.1 Report the following information: 10.1.1 Organisms used, 10.1.2 Time of incubation, 10.1.3 Visual rating of fungus growth according to 9.3, including magnification for rating of 1 or less, and 10.1.4 Table of progressive change in physical, optical, or electrical property against time of incubation. Give the rating for each replicate. 11. Precision and Bias 11.1 A precision and bias statement cannot be made for this practice at this time. 12. Keywords 12.1 fungal biosusceptibility; fungal decay; microbiological; assay; microbiological susceptibility."

Substrates

Materials of the present disclosure can be disposed on one or more surfaces of a substrate, such as one or more surfaces of a vehicle component. A material of the present disclosure can be disposed on a substrate surface at a thickness of less than about 2 inches, such as less than about 1 inch, such as less than about 0.5 inches, such as less than about 0.4 inches, such as less than about 0.3 inches, such as less than about 0.2 inches, such as less than about 0.1 inches.

A vehicle component is any suitable component of a vehicle, such as a structural component, such as a panel or joint, of an aircraft, automobile, etc. Examples of a vehicle component include an auxiliary power unit (APU), a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Figure 1:
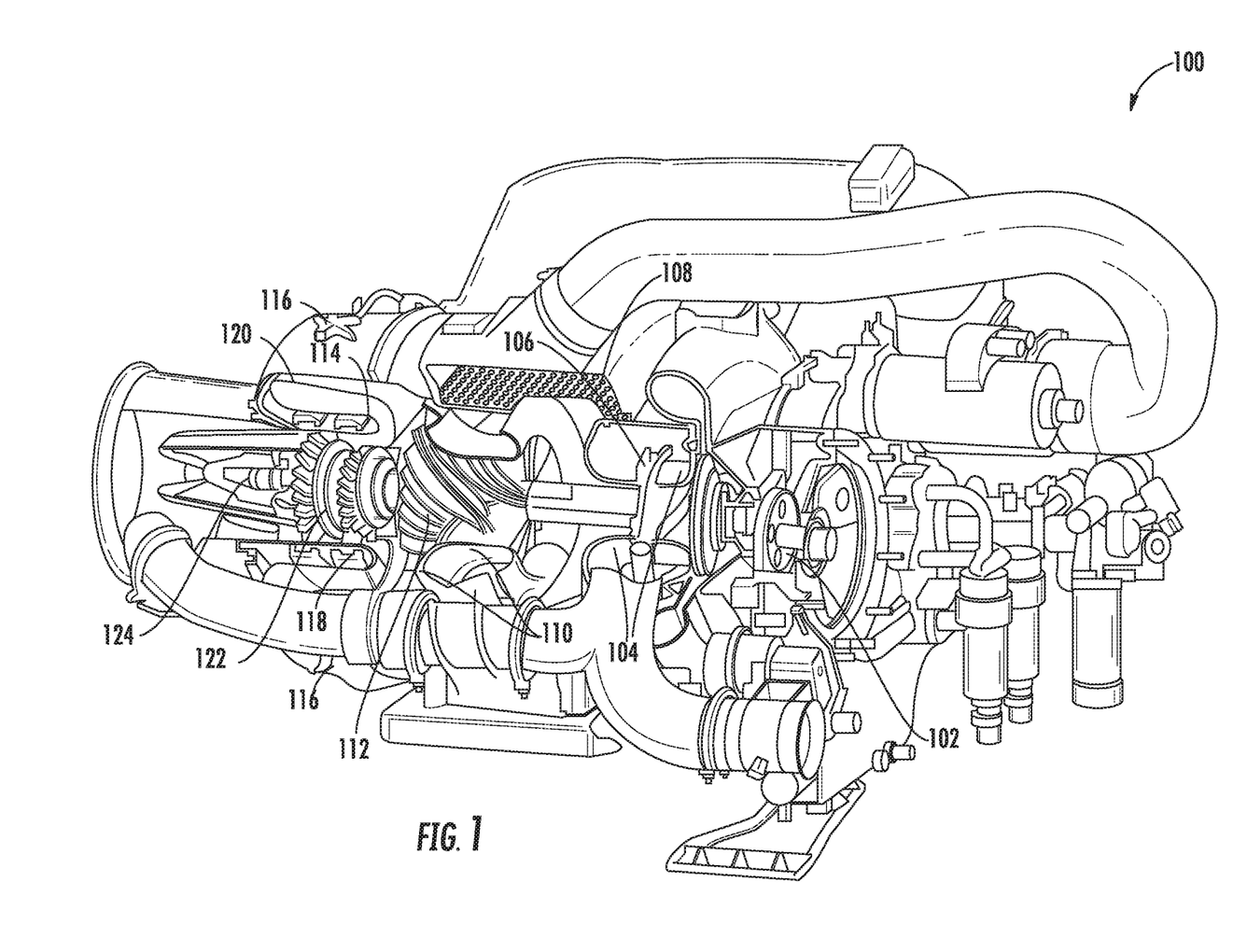
FIG. 1 is a perspective view in partial section of an auxiliary power unit (APU) of an aircraft, according to one aspect of the present disclosure.

FIG. 1 is a perspective view in partial section of an auxiliary power unit (APU) of an aircraft. As shown in FIG. 1, APU 100 has a thrust bearing 102, a load compressor 104, an inlet guide vane assembly 106, a perforated inlet housing 108, an engine compressor hub containment 110, a high pressure ratio compressor 112, a cooled first-stage nozzle 114, dual-orifice fuel atomisers 116, full turbine-hub containment 118, an effusion-cooled combustor 120, a two stage axial turbine 122, and a two-bearing, four-wheel rotating group 124. One or more of these APU components can have a material of the present disclosure disposed on one or more surfaces of the component. During use, the temperature of the APU increases substantially from an ambient temperature. A material of the present disclosure reduces or elimi- nates thermal stress on the APU and reduces or eliminates mold formation that may occur when the APU is not in use.

Figure 2:
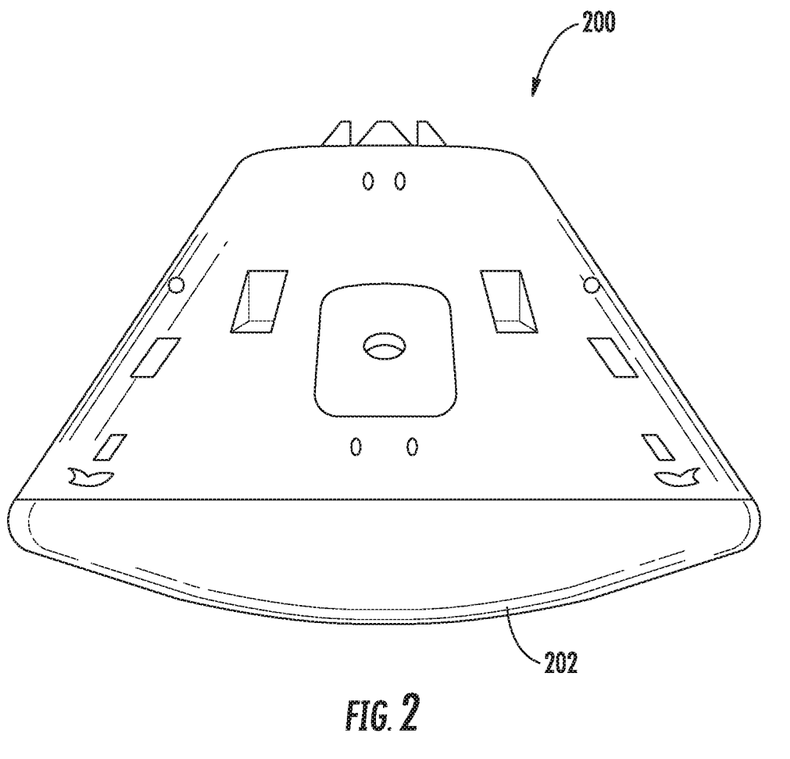
FIG. 2 is a side view of a spacecraft, according to one aspect of the present disclosure.

FIG. 2 is a side view of a spacecraft. As shown in FIG. 2, spacecraft 200 has a heatshield structure 202 bound on the surface thereof. Heatshield structure 202 has a material of the present disclosure disposed on and/or within the heatshield structure. Heatshield structure 202 protects the spacecraft 200 and its occupants from the heat generated during reentry into the Earth's atmosphere. A material of the present disclosure reduces or eliminates thermal stress on the heatshield (and spacecraft) and reduces or eliminates mold formation that may occur when the heatshield (and spacecraft) are not in use.

While the heatshield structure 202 is shown on a manned spacecraft, it will be appreciated that heatshield structure 202 is well suited for use on a wide variety of other manned and unmanned space vehicles that are expected to encounter high temperatures on their exterior surfaces during travel through the Earth's, or a planetary atmosphere. Heatshield structure 202 is also usable on other forms of vehicles, and possibly even on fixed (e.g., non-mobile) structures. Heatshield structure 202 may find use on virtually any form of mobile airborne platform or ground based vehicle, or possibly even on marine vehicles.

Alternative uses of materials of the present disclosure (besides as heatshields) include, but are not limited to, as adhesives for applications involving bacteriostatic or fungicidal applications, as a paint additive for increasing hardness and algaecidal properties, or as an anti-mildew additive for compositions in wet environments.

Application of Materials to a Substrate

Materials of the present disclosure can be disposed on a substrate, such as a surface of a vehicle component, by any suitable deposition method, such as flow-coating, drop-casting, dip-coating, spray-coating, screen printing, slot-die coating, flow coating and/or ink-jet printing. Materials of the present disclosure can be disposed on one or more surfaces of a vehicle component (such as an inner surface (e.g., inner cavity), an outer surface, or both, of a vehicle component) by depositing the material onto the one or more surfaces of the vehicle component.

For materials of the present disclosure that contain cork particles, the cork can be cleaned, ground into a desired particle size, and mixed with a binder, a curing agent, and a zinc pyrithione before depositing and curing the material.

Conventional heatshields made of cork are made by pressing cork onto a substrate, followed by finishing the cork. For example, when cork is applied to an auxiliary power unit (APU), it is cork board that is pasted/glued onto an aluminum surface of an APU component, and then the cork is cleaned with one or more solvents. The cork is dried with heat to remove moisture from the cork. The cork is then coated with a resin (e.g., epoxy). The cork-epoxy is then coated with a sealant (such as silicone) that cures at room temperature. The sealant surface is then cleaned to obtain a uniform pore-free coating. However, the sealant takes up to 6 days to cure at RT or 2 days in an oven.

Heatshield materials of the present disclosure render several of these processing procedures merely optional, such as drying the cork, applying adhesive to cork board, coating a material with a sealant (such as silicone), and cleaning a sealant surface. For example, because of the antibiotic activity (moisture protection ability) of zinc pyrithione throughout the material, cork does not have to be dried and a silicone resin does not have to be applied to the cork material in order to protect the cork material from moisture exposure. Furthermore, because zinc pyrithione can improve the adhesive strength of a heatshield material of the present disclosure as compared to the same heatshield material without zinc pyrithione, applying additional adhesive is optional. Eliminating one or more of these processing procedures provides substantial time and cost savings for the manufacturer.

After depositing a material of the present disclosure onto a substrate surface, the material can be cured. Curing a material can be performed at room temperature. Alternatively, curing may comprise raising the temperature of the material to a peak curing temperature and maintaining the peak curing temperature for between about 1 second and about 48 hours, such as between about 1 hour and about 10 hours. The peak curing temperature is between about 30° C. and about 200° C., such as between about 50° C. and about 90° C., for example 50° C., 60° C., 70° C., 80° C., 90° C.

For methods described herein, depositing the material onto a substrate surface can be achieved by spin-coating the first material onto a surface of a substrate, such as a vehicle component, at a rate of between about 100 rpm and about 4,000 rpm, such as between about 500 rpm and about 2,000 rpm, for example about 500 rpm, about 1,000 rpm, about 1,500 rpm, about 2,000 rpm.

Honeycomb Heatshields

Materials, such as heatshield materials, of the present disclosure can be used alone as a heatshield or incorporated onto and/or into a honeycomb core. A honeycomb core provides additional mechanical strength and heat shielding ability to a heatshield. Materials of the present disclosure (such as those comprising cork) can be used as a secondary heatshield in case the honeycomb structure is compromised.

A honeycomb core can be made of a plurality of intersecting wall portions forming a plurality of cells. A strain compliant material can be disposed on the wall portions of the honeycomb core prior to filling of the cells with a heatshield material of the present disclosure. The heatshield material at least partially fills the cells of the honeycomb core.

Figure 3:
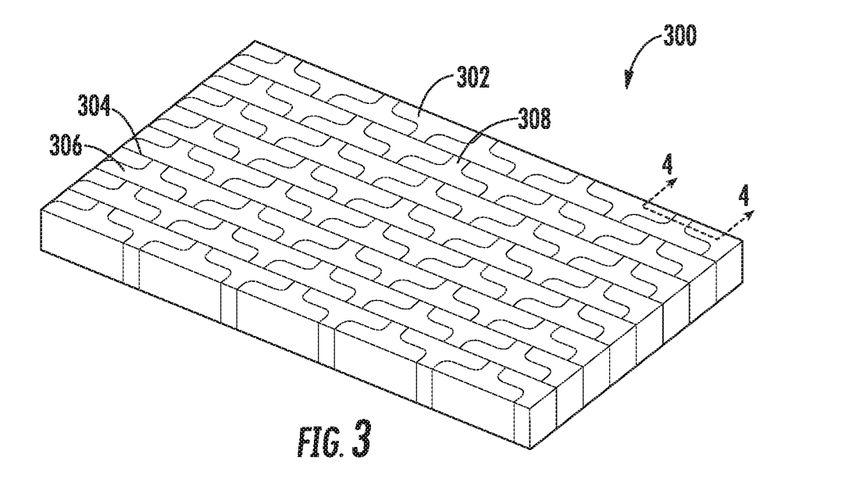
FIG. 3 is a perspective view of one section of a honeycomb heatshield, according to one aspect of the present disclosure.

FIG. 3 is a perspective view of one section of a honeycomb heatshield. As shown in FIG. 3, heatshield 300 includes a honeycomb core 302. Honeycomb core 302 has a plurality of intersecting wall portions 304 that form a plurality of cells 306. Material 308 is a heatshield material of the present disclosure and is press fit into the cells 306 of honeycomb core 302.

Figure 4:
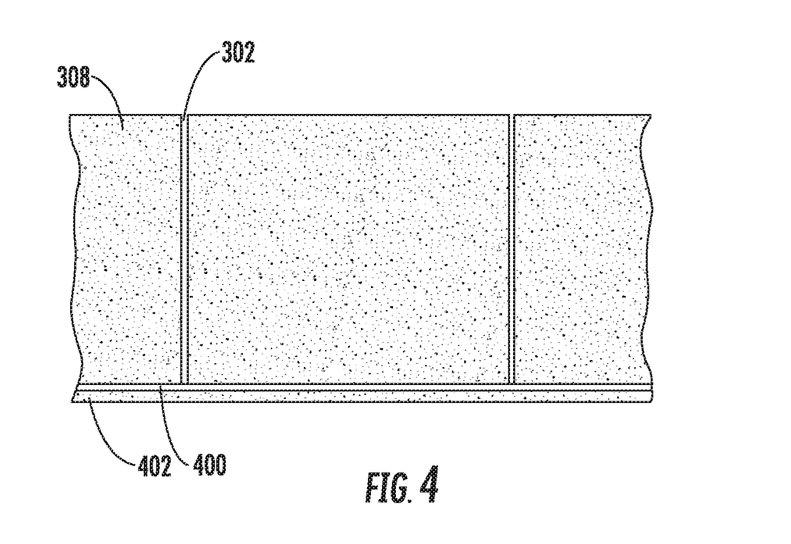
FIG. 4 is a cross section of the honeycomb heatshield of FIG. 3, according to one aspect of the present disclosure.

FIG. 4 is a cross section of the heatshield of FIG. 3. As shown in FIG. 4, honeycomb core 302 can be secured via an adhesive layer 400 to a carrier structure 402.

In at least one aspect, honeycomb core 302 is made of a fabric of fiberglass, for example Style 120 (E-glass), which is impregnated with a phenolic resin. In at least one aspect, honeycomb core 302 is made of a Leno weave fiberglass or carbon fiber fabric having an open weave construction. This enables material 308, when compressed into the cells 306 of honeycomb core 302, to fill cells 306 and become an integral portion of the wall structure of honeycomb core 302. Prior to filling the cells 306 of honeycomb core 302 with material 308, honeycomb core 302 can be cleaned with a radio frequency (RF) generated plasma field so that its surfaces are thoroughly conditioned for the remaining manufacturing operations (if any) to which honeycomb core 302 will be subjected. The plasma field cleaning treatment is a process that is commercially available. One such company performing this process is 4$^{th}$ State, Inc., of Belmont, Calif.

Figure 5:
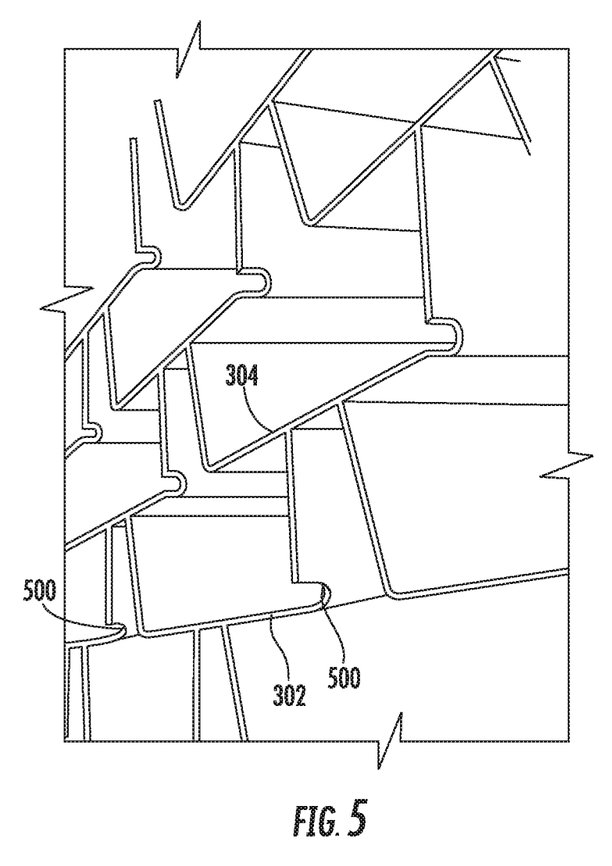
FIG. 5 is a perspective view of a carrier panel side of a honeycomb panel, according to one aspect of the present disclosure.

FIG. 5 is a perspective view of the carrier panel side of a honeycomb panel. As shown in FIG. 5, (following cleaning, and prior to filling the cells 306 with material 308), walls 304 of honeycomb core 302 are partially slotted, which can be achieved using a diamond edged cutting tool, on the side of honeycomb core 302 that will be bonded to heatshield carrier structure 402. Slots 500 provide escape paths for ambient air that might otherwise create back pressure in cells 306 during the subsequent honeycomb core 302 filling process, and for water and gases that evolve during a subsequently performed autoclave curing process. The air, water and gases are drawn off by a vacuum that is applied to a vacuum bag enclosing a preform to form heatshield 300 comprising material 308, honeycomb core 302, and carrier structure 402.

In at least one aspect, carrier structure 402 is made of a layer structure of one or more metal sheets, or possibly even as a honeycomb structure having metal, for example titanium or aluminum, flat sheets. Adhesive layer 400 can be made of any suitable adhesive, such as HT-424 adhesive, which is an epoxy-phenolic structural film adhesive commercially available from Cytec Industries, Inc. of West Paterson, N.J.

Overall, materials of the present disclosure provide thermal stress protection in addition to antibiotic activity. Zinc pyrithiones do not have restrictions for aircraft applications in the European Union or elsewhere worldwide, some are commercially available, they are easy to synthesize, and are inexpensive. Furthermore, decomposition temperatures of zinc pyrithiones are high (e.g., 464° F.), they have limited water solubility (e.g., 8 ppm at pH 7), and have antibiotic activity sufficient to prevent or reduce microbial degradation of biologically active components (such as cork) nearby or within the material.

Furthermore, zinc pyrithiones of the present disclosure can be present in a material, such as a heatshield material, in amounts small enough such that the physical properties of the material are improved or are not substantially altered compared to an otherwise identical material without a zinc pyrithione. Furthermore, zinc pyrithiones of the present disclosure can be present in a material, such as a heatshield material, in amounts small enough such that pot life of the material is not substantially altered compared to an otherwise identical material without a zinc pyrithione.

In addition, a zinc pyrithione provides dual functionality when present within or disposed on a material of the present disclosure: (1) as an antibiotic to reduce or eliminate mold formation, and (2) as a curing agent in addition to the curing agent. Such dual functionality can be used to reduce pot life in addition to reduction or elimination of mildew and fungus (mold) accumulation within or on the material, while maintaining or improving the physical properties of the material (as compared to the material without zinc pyrithione).

Furthermore, a zinc pyrithione can be incorporated into the binder/curing agent of materials of the present disclosure. Unlike conventional antibiotics that are only applied to a binder surface, incorporation of zinc pyrithione into a material prevents mold formation within the material, on the material, and/or adjacent the material even if a surface of the material chips away during use and regardless of how large of a surface area of the material is chipped away (i.e., exposed). Such incorporation of zinc pyrithione extends the advantageous physical and mechanical properties of the material.

While the foregoing is directed to aspects of the present disclosure, other and further aspects of the present disclosure may be devised without departing from the basic scope thereof. Furthermore, while the foregoing is directed to material systems, such as aircraft material systems, such as panels, coated lap joints between two or more panels, and wing-to-fuselage assemblies, aspects of the present disclosure may be directed to other material systems not associated with an aircraft, such as a multicomponent material system used in aerospace, automotive, marine, energy industry, and the like.

What is claimed is:

1. A material that is the reaction product of:
a binder;
a curing agent;
a zinc pyrithione represented by Formula (I):

wherein $R^1$ and $R^5$ are each independently an alkyl and wherein $R^2$, $R^3$, $R^4$, $R^6$, $R^7$, and $R^8$ are hydrogen; and
cork,
wherein the material has an antibiotic activity rating of 0 after 4 weeks according to ASTM G21-15.

2. The material of claim 1, wherein the zinc pyrithione has a decomposition temperature greater than 400° F.

3. The material of claim 1, wherein the zinc pyrithione has a water solubility of less than 100 ppm at pH 7.

4. The material of claim 1, wherein the material has a density between about 0.8 g/cc and about 1.2 g/cc.

5. The material of claim 1, wherein the material has a pot life of less than 24 hours at room temperature.

6. The material of claim 1, wherein the material comprises zinc pyrithione in a range from 0.5 wt % to 5 wt %.

7. The material of claim 1, wherein the material comprises between about 8 wt % and about 12 wt % cork.

8. The material of claim 1, wherein the binder is selected from the group consisting of phenolic, epoxy, silicone, polyurethane, and mixtures thereof.

9. The material of claim 1, wherein the curing agent is selected from the group consisting of alkyl diamine, cycloalkyl diamine, monoaryl diamine, polyaryl diamine, and mixtures thereof.

10. The material of claim 1, wherein the reaction product of the zinc pyrithione and the binder is incorporated within the material in which a nucleophilic moiety of the zinc pyrithione reacts with an electrophilic moiety of the binder.

11. A material that is the reaction product of:
a binder;
a curing agent;
a zinc pyrithione represented by Formula (I):

wherein $R^3$ and $R^7$ are each independently an alkyl and wherein $R^1$, $R^2$, $R^4$, $R^5$, $R^6$, and $R^8$ are hydrogen; and
cork,
wherein the material has an antibiotic activity rating of 0 after 4 weeks according to ASTM G21-15.

12. A material that is the reaction product of:
a binder;
a curing agent;
a zinc pyrithione represented by Formula (I):

wherein $R^4$ and $R^8$ are each independently an alkyl and wherein $R^1$, $R^2$, $R^3$, $R^5$, $R^6$, and $R^7$ are hydrogen; and
cork,
wherein the material has an antibiotic activity rating of 0 after 4 weeks according to ASTM G21-15.

13. The material of claim 1, wherein said cork is selected from the group consisting of a cork board, cork particles, and combinations thereof.

14. The material of claim 11, wherein the zinc pyrithione has a decomposition temperature greater than 400° F.

15. The material of claim 11, wherein the zinc pyrithione has a water solubility of less than 100 ppm at pH 7.

16. The material of claim 11, wherein the material has a density between about 0.8 g/cc and about 1.2 g/cc.

17. The material of claim 11, wherein the material has a pot life of less than 24 hours at room temperature.

18. The material of claim 11, wherein the material comprises zinc pyrithione in a range from 0.5 wt % to 5 wt %.

19. The material of claim 11, wherein the material comprises between about 8 wt % and about 12 wt % cork.

20. The material of claim 11, wherein the binder is selected from the group consisting of phenolic, epoxy, silicone, polyurethane, and mixtures thereof.

21. The material of claim 11, wherein the curing agent is selected from the group consisting of alkyl diamine, cycloalkyl diamine, monoaryl diamine, polyaryl diamine, and mixtures thereof.

22. The material of claim 11, wherein the reaction product of the zinc pyrithione and the binder is incorporated within the material in which a nucleophilic moiety of the zinc pyrithione reacts with an electrophilic moiety of the binder.

23. The material of claim 11, wherein said cork is selected from the group consisting of a cork board, cork particles, and combinations thereof.

24. The material of claim 12, wherein the zinc pyrithione has a decomposition temperature greater than 400° F.

25. The material of claim 12, wherein the zinc pyrithione has a water solubility of less than 100 ppm at pH 7.

26. The material of claim 12, wherein the material has a density between about 0.8 g/cc and about 1.2 g/cc.

27. The material of claim 12, wherein the material has a pot life of less than 24 hours at room temperature.

28. The material of claim 12, wherein the material comprises zinc pyrithione in a range from 0.5 wt % to 5 wt %.

29. The material of claim 12, wherein the material comprises between about 8 wt % and about 12 wt % cork.

30. The material of claim 12, wherein the binder is selected from the group consisting of phenolic, epoxy, silicone, polyurethane, and mixtures thereof.

31. The material of claim 12, wherein the curing agent is selected from the group consisting of alkyl diamine, cycloalkyl diamine, monoaryl diamine, polyaryl diamine, and mixtures thereof.

32. The material of claim 12, wherein the reaction product of the zinc pyrithione and the binder is incorporated within the material in which a nucleophilic moiety of the zinc pyrithione reacts with an electrophilic moiety of the binder.

33. The material of claim 12, wherein said cork is selected from the group consisting of a cork board, cork particles, and combinations thereof.

* * * * *